UNITED STATES PATENT OFFICE.

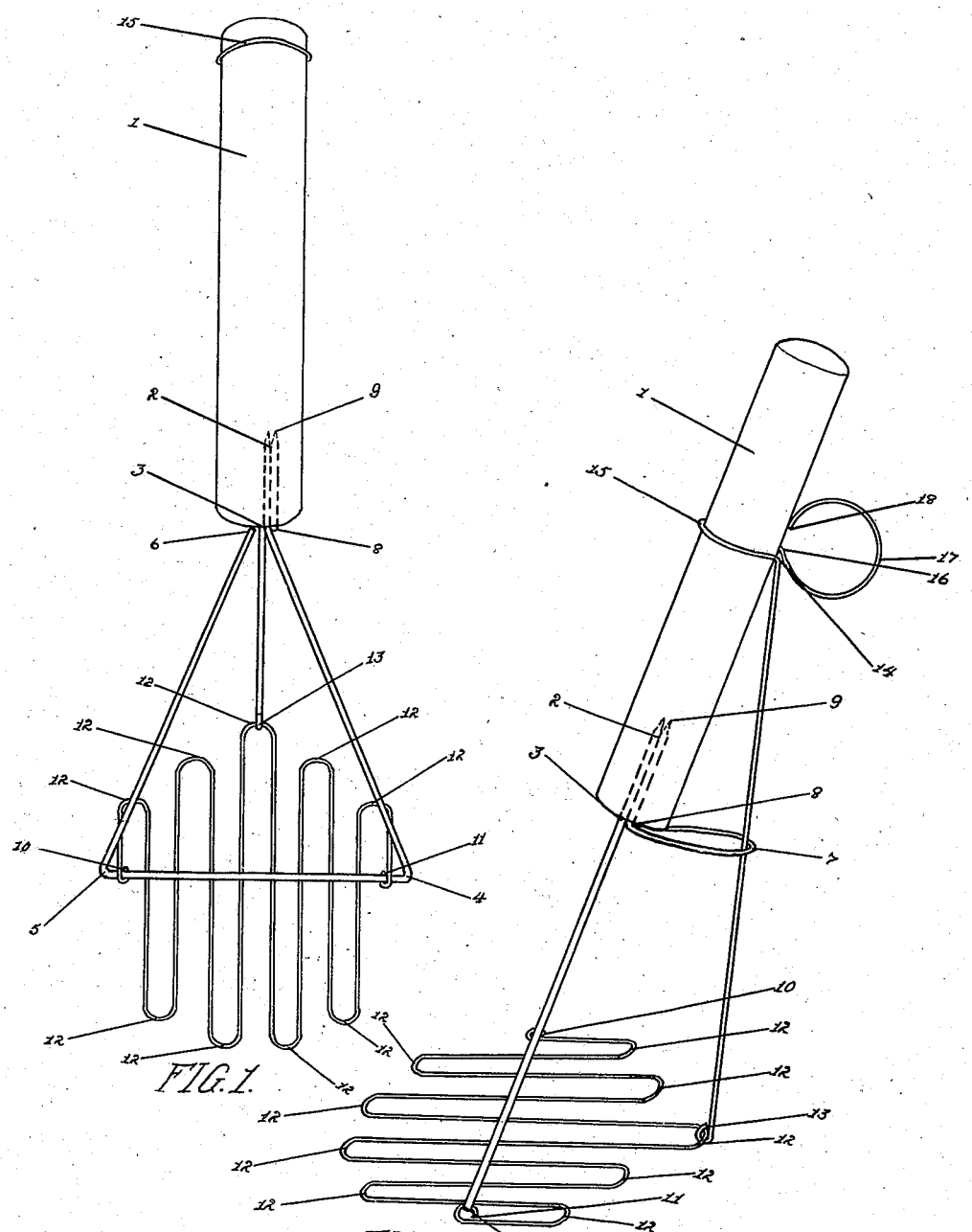

CHARLES R. TUSON, OF WINDSOR, ONTARIO, CANADA.

COMBINATION KITCHEN UTENSIL.

No. 881,268.  Specification of Letters Patent.  Patented March 10, 1908.

Application filed September 27, 1907. Serial No. 394,890.

*To all whom it may concern:*

Be it known that I, CHARLES R. TUSON, a subject of the King of Great Britain, residing at the city of Windsor, in the county of Essex, in the Province of Ontario, Canada, have invented a new and useful Improvement in a Combination Kitchen Utensil, and declare the following to be a full, clear, and exact description of the same, such as will enable others skilled in the art to which it pertains to make and use the same, reference being had to the accompanying drawings, which form part of this specification.

My invention relates to improvements in the construction of kitchen utensils, so that one combination utensil may be altered and adjusted and adapted for different uses, so as to combine in one implement the advantages found in several implements now used in the kitchen work.

In the drawings, Figure 1, is a plan front view showing the invention. Fig. 2, is a perspective view showing the invention adjusted for use, as in beating or whipping cream or batter, mashing or lifting potatoes or other vegetables.

Similar letters and similar figures refer to similar parts throughout the drawings.

1, indicates a handle, made of wood or other suitable material; 2, 3, 4, 5, 6, 7, 8 and 9, indicate points in a continuous wire, extending from one extremity 2 to its extremity 9, both extremities 2 and 9, being inserted in the handle, the portions between the points indicated by 3, 4, 5, 6, being bent to form a wire frame in the form of an isosceles triangle, the portions between 6, 7, 8, being bent circular to form a loop, at right angles to the base of the triangle, and at the base of the handle, 1; 10, 12, 11, indicates point in a continuous wire, the extremities of the wire being looped around and thus permanently attached to the wire forming the base of the isosceles triangle 3, 4, 5, 6, as at 10 and 11, then continued on an even plane through 12, forming a coil of bars of wire crossing and recrossing, next to and below the wire forming the base 4, 5, of the isosceles triangle; 13, 14, 15, 16, 17, 18, indicate points in a continuous wire, extending from its extremity 13, where it is looped around and permanently engages with the coil of bars of the wire, 10, 12, 11, passing through the wire guide loop, 6, 7, 8, to the point 14, where it is bent, first at right angles then circular, 14, 15, 16, to form a loop encircling the handle, 1, then again bent at 16, to form the circular loop 16, 17, 18, at right angles to the plane of the circular loop, 14, 15, 16.

In use, the plane of the wire coil 10, 12, 11, in its relation to the frame of the instrument, is readily altered and adjusted for the different uses intended, simply by pushing the wire loop, 14, 15, 16, encircling the handle, upward or downward along the handle, thus forcing the extremity 13, of the wire 13, 14, 18, and the point 12, in the coiled wire, 10, 11, to which it is attached, upward or downward as required.

What I claim as my invention, and desire to secure by Letters Patent is,—

The combination of a handle, 1, with three wires, one of such wires having one of its extremities inserted in the handle, as indicated at 2, bent and extending from the handle, at 3, continuing, to form a wire frame in the form of an isosceles triangle 3, 4, 5, 6, bent at right angles at 6, and looped to form the guide loop, 6, 7, 8, again bent at right angles at 8, to enter the handle, 1, to its extremity, 9; the second wire, formed into a coil, on an even plane, placed beneath and joined to the base, 4, 5, of the isosceles triangle of the frame, by being looped around the base, 4, 5, at its extremities, as indicated at 10 and 11; the third wire extending from, looped around and engaging with the second wire, as indicated at 13, passing through the guide loop, 6, 7, 8, of the first wire, bent at right angles at the point 14, then looped to encircle the handle, as indicated at 14, 15, 16, then finally bent circular to form the loop, as indicated at 16, 17, 18, at right angles to the plane of the loop, 14, 15, 16; the second and third wires being adjustable, by moving the encircling loop, 14, 15, 16, up or down the handle, 1, to change the relation of the plane of the coil of the second wire, as required, substantially as described, and for the purposes specified.

Windsor, Ontario, September 20, 1907.

CHAS. R. TUSON.

Witnesses:
 C. WILLIAMSON,
 H. L. WRONG.